UNITED STATES PATENT OFFICE.

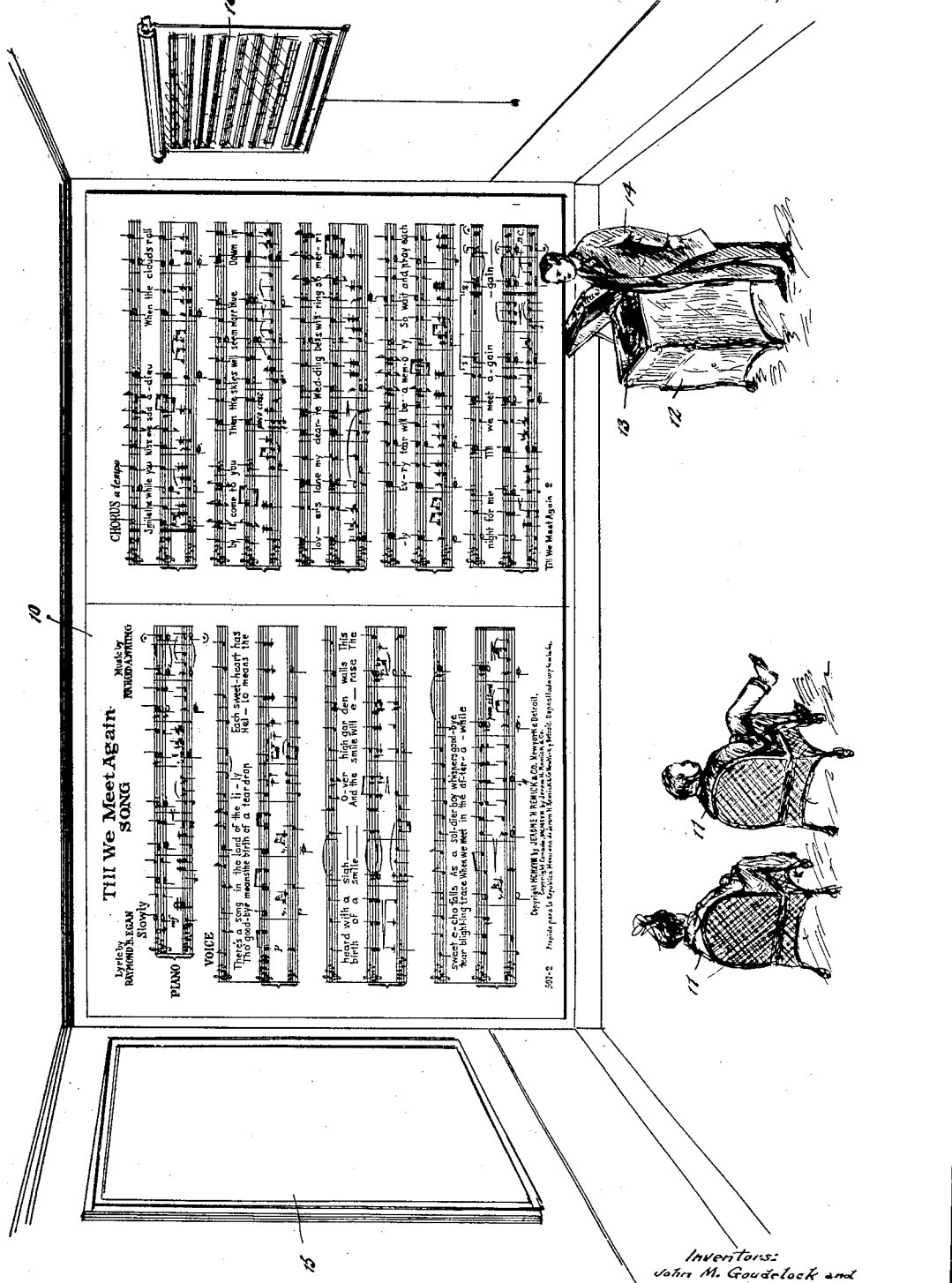

JOHN M. GOUDELOCK AND REUEL E. WEINBERG, OF BIRMINGHAM, ALABAMA.

METHOD AND MEANS FOR ADVERTISING AND SELLING PHONOGRAPH-RECORDS AND SHEET-MUSIC.

1,331,254.  Specification of Letters Patent.  Patented Feb. 17, 1920.

Application filed June 17, 1919. Serial No. 304,880¼.

*To all whom it may concern:*

Be it known that we, JOHN M. GOUDELOCK and REUEL E. WEINBERG, citizens of the United States, and residents of Birmingham, Alabama, have invented certain new and useful Improvements in Methods and Means for Advertising and Selling Phonograph-Records and Sheet-Music, of which the following is a specification.

The present invention relates to improved methods and means for advertising and selling phonograph records and sheet music, and has for an object to produce by its peculiar appeal a stimulated desire on the part of a prospective purchaser to buy a particular piece of sheet music and a phonograph record corresponding thereto.

It is well known that certain impressions create desire, and that impressions upon two senses, that is the senses of sight and hearing, will be very much greater than either of these impressions alone. Another fact is that the handling and reading of a certain article as for instance a piece of sheet music, *per se*, satisfies to a certain degree the desire to own it, in other words, the impression of sight and handling, lessens to some extent, the desire to own the piece of music, for the very simple reason that ownership diminishes desire in proportion to the length of ownership, and handling and reading is in effect ownership for the period during which the object is handled and read and consequently the desire is diminished in proportion. Should however, the desire be stimulated by sight, without handling, and in a manner which would not create or produce the desire to own the particular object of sight, but would create in the mind of the prospective purchaser a mental picture only of a counterpart of the object that it would be possible to own, the desire for ownership would be stimulated and increased, without any partial satisfaction or loss of desire.

At the same time the hearing of a phonograph record in connection with the visual display of the music score will stimulate the desire to own the record also.

We propose in the present invention therefore, to display in connection with the playing of a phonograph record, a very large representation of a sheet of music corresponding to the selection being played by the phonograph, of such size that it may be hung on a wall and viewed at a distance, the impression upon the sense of sight being complete, while the desire to own the particular object displayed is in no manner stimulated or created, because of the very impossibility of individually handling or using such an object; while, on the other hand, the desire to own a piece of sheet music corresponding thereto, the possibility of buying, handling and owning which is created in the mind of the prospective purchaser, is greatly stimulated but in no way satisfied. As above stated, the simultaneous hearing of the music being played by the phonograph record greatly increases this desire and after the production of such impressions upon the senses of sight and hearing and while the memory of the same is fixed in the mind of the prospective purchaser, the conditions for selling to this prospective purchaser the phonograph record and a piece of sheet music corresponding thereto, are very favorable and the desire on the part of the prospective purchaser is at its crest. This is particularly true if the auditor happens to possess musical accomplishments of either a vocal or instrumental character. In such cases, the desire for possession is greatly enhanced since the auditor may hum the words or air of the musical composition with the accompaniment of the phonograph. For this reason the enlarged reproduction of the musical composition to be sold is of great importance as it enables the auditor in remote parts of the room to apply the words when the phonographic reproduction thereof may be imperfect or inaudible owing to deficient acoustic facilities.

In the accompanying drawing which shows a perspective view of the end of a room, we have illustrated this method of selling and the means therefor, a very large representation of a piece of sheet music 10 being hung upon the wall in such manner that it may be viewed by the prospective purchasers 11 who are seated at some distance therefrom, and at a suitable position in the room or show window so as not to detract from the sense of sight, and at the same time so as to impress the sense of hearing in the most favorable manner, there is provided a phonograph 12 upon which the phonograph record 13 corresponding to the piece of music displayed upon the sheet, is being played. The salesman 14 standing beside the phonograph, may preferably be a trained singer, in which case he will sing the song at the same time it is being played by the phonograph and its visual representation viewed by the prospective purchaser, thereby enhancing the phonetic rendering of the piece.

We have also shown by way of modifications, a plurality of swinging panels 15 hung upon the side wall and which contain enlarged visual representations of music, and upon the other side wall we have shown an enlarged visual representation of music 16 mounted upon a spring roll and which may be rolled up when not being used. In the first case, each panel may contain on one or both sides a complete representation of a sheet of music, the panels being such that they may be swung into position to be viewed. In this way, a number of popular pieces may be so represented. In the case of the spring roll, the piece may be rolled up when not in use and several such rolls with different pieces may be provided.

We have illustrated and described preferred and satisfactory embodiments of our invention, but it will be understood that changes may be made therein within the spirit and scope thereof as defined in the appended claims.

We claim:

1. The art, as described, for making more effective phonographic reproductions, which consists in placing in view of the auditor of the phonographic reproduction an enlarged copy of the complete composition, such enlarged complete copy being adapted to be displayed against a wall or the like, and said enlarged complete copy being arranged in the same key with the reproduction played by the phonograph.

2. The art, as described, for stimulating the sales of sheet music and phonograph records, which consists in playing a record on a phonograph, and at the same time placing against a wall or the like in full view of the auditors of the phonographic reproduction an enlarged copy of the complete score containing both the words and music of the phonographic reproduction, whereby the enlarged complete displayed copy and the playing of the record create through the two senses of seeing and hearing the desire of possession on the part of the auditors of the corresponding sheet of music and the phonograph record.

In testimony that we claim the foregoing as our invention, we have signed our names in presence of two subscribing witnesses.

JNO. M. GOUDELOCK.
REUEL E. WEINBERG

Witnesses:
M. A. PHILLIPS,
D. H. MARING.